United States Patent [19]
Langenskiöld

[11] Patent Number: 6,122,238
[45] Date of Patent: Sep. 19, 2000

[54] METHOD FOR AUTOMATICALLY CHECKING CIRCULAR INFORMATION CARRIERS

[75] Inventor: Carl Gustaf Langenskiöld, Stockholm, Sweden

[73] Assignee: M2 Engineering AB, Kista, Sweden

[21] Appl. No.: 09/077,328

[22] PCT Filed: Nov. 26, 1996

[86] PCT No.: PCT/SE96/01543
§ 371 Date: May 27, 1998
§ 102(e) Date: May 27, 1998

[87] PCT Pub. No.: WO97/20312
PCT Pub. Date: Jun. 5, 1997

[30] Foreign Application Priority Data

Nov. 27, 1995 [SE] Sweden .................................. 9504228

[51] Int. Cl.[7] ......................................................... G11B 3/90
[52] U.S. Cl. ................................................................. 369/58
[58] Field of Search .................................. 369/58, 44.32, 369/54; 356/237.1, 237.2

[56] References Cited

U.S. PATENT DOCUMENTS

| | | | |
|---|---|---|---|
| 5,212,677 | 5/1993 | Shimote et al. | 369/58 |
| 5,729,520 | 3/1958 | Klicker | 369/58 |
| 5,909,117 | 6/1999 | Nakadai et al. | 369/58 |
| 5,940,174 | 8/1999 | Mueller et al. | 356/237.2 |

FOREIGN PATENT DOCUMENTS 0 354 834  2/1990  European Pat. Off. .
0 574 975  12/1993  European Pat. Off. .

OTHER PUBLICATIONS

Patent Abstracts of Japan, vol. 12, No. 290, P–742 A 63–67550, Pioneer Electronic Corp., Mar. 26, 1988.

*Primary Examiner*—Thang V. Tran
*Attorney, Agent, or Firm*—Jacobson, Price, Holman & Stern, PLLC

[57] ABSTRACT

A method for automatically checking circular information carriers that includes identifying the information carrier, checking for possible defects in the information carrier, and presenting detected defects graphically. To identify the information carrier, a first process is carried out of image recognition within a label sector on the information carrier having sight-readable characters. To check the information carrier, a second process is carried out within an information sector of the information carrier that has stored data. Defects detected in the information sector are presented in the graphic presentation in relation to the label sector, thereby enabling the position of a detected defect to be determined more readily as a result of obtained directional information.

2 Claims, 2 Drawing Sheets

Fig 1
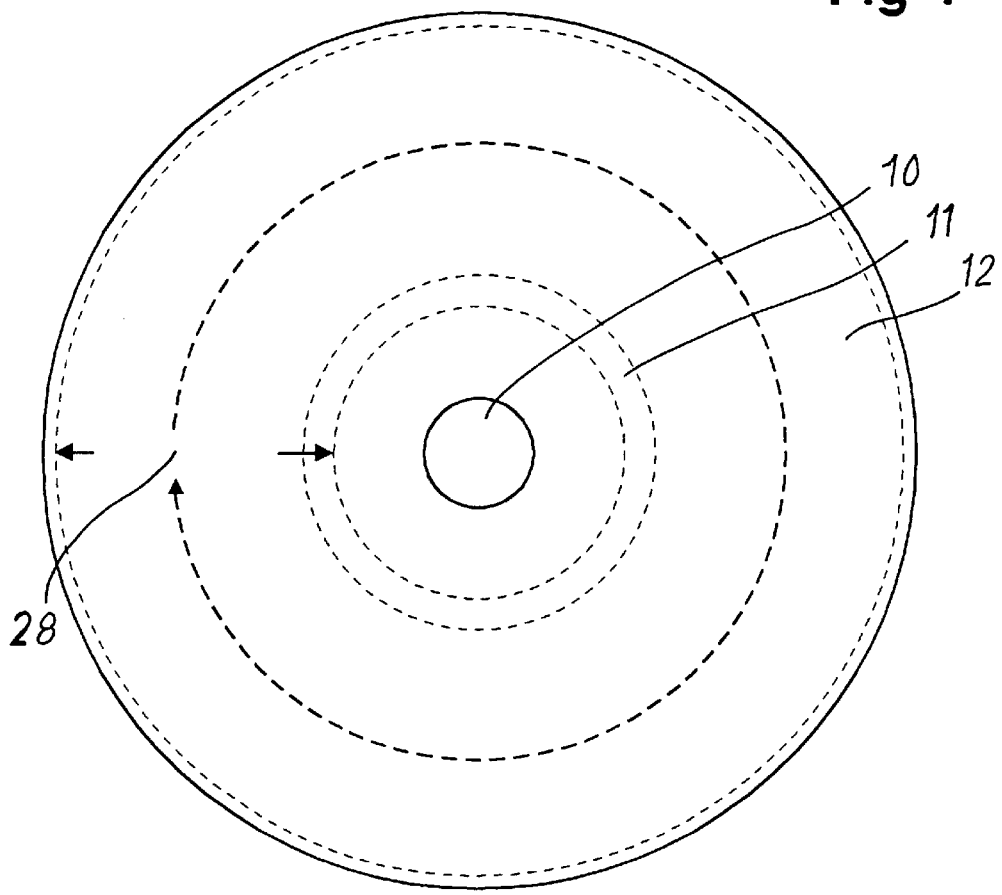
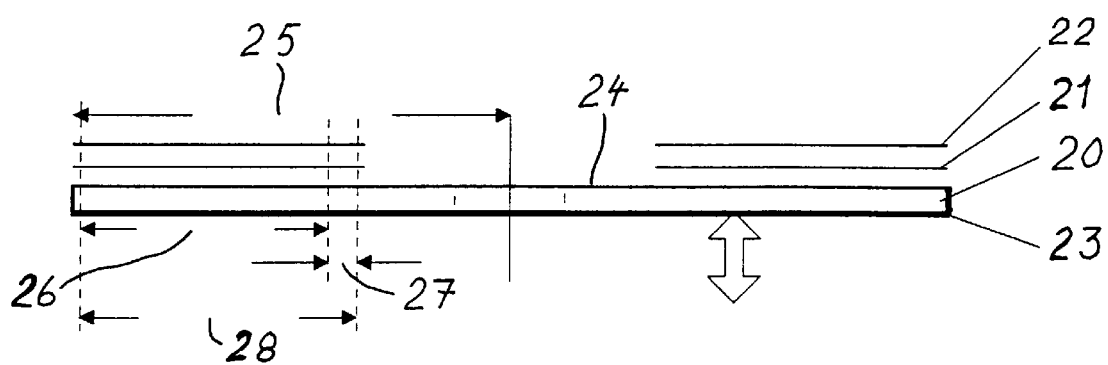
Fig 2

METHOD FOR AUTOMATICALLY CHECKING CIRCULAR INFORMATION CARRIERS

FIELD OF INVENTION

The present invention relates to a method of automatically checking disc-shaped information carriers, for instance compact discs. The method involves identifying information carriers, surface checking for possible faults, errors, damage or other defects in the surface of the information carrier, and presenting graphically any defects that are found.

DESCRIPTION OF THE BACKGROUND ART

Automatic compact disc (CD) checking devices are available commercially from a number of suppliers. The purpose of these devices is to check compact discs for faults, errors, damage and/or cosmetic defects with the aid of a defect analysing process, and to sort out unacceptable discs automatically. The majority of these devices include some form of software with which defective sectors can be presented graphically on a computer screen.

A special image recognition camera may be used to ascertain that "correct" compact discs are checked, i.e. it can be ensured that compact discs that carry different titles are not mixed together, because each title has a unique identity which is named or numbered in some way in the label sector of the disc.

Despite the ability to present compact disc defects graphically, the defects are difficult to localize since no directional information is given in the image presented on the screen.

Image recognition cameras are a very expensive pieces of supplementary equipment and it is also difficult to find a mounting location for such cameras in the close proximity of the checking device. Furthermore, such cameras do not provide directional information in the recorded image or picture The object of the present invention is to eliminate the aforesaid drawbacks.

SUMMARY OF THE INVENTION

In accordance with the inventive method, there is for the purpose of identifying the information carrier carried out a first process for image recognition within a label sector of the information carrier having characters that can be sight-read, and for the purpose of surface checking the information carrier carried out a second process within an information sector of the information carrier having stored data, and discovered defects are presented in the graphic presentation in relation to the label sector, whereby localization of occurrent defects is facilitated by the directional information obtained.

In accordance with a further development of the invention, direction determined images of information carriers are stored on top of one another in the graphic presentation, so that all label sectors from separate information carriers will cover one another, thereby greatly facilitating the analysis of causes of detected defects.

BRIEF DESCRIPTION OF THE DRAWING

The invention will now be described in more detail with reference to the accompanying schematic drawings, in which FIG. 1 illustrates a compact disc from above;

FIG. 2 is a side view of the disc shown in FIG. 1; and

DETAILED DESCRIPTION OF THE INVENTION

Figure 3:
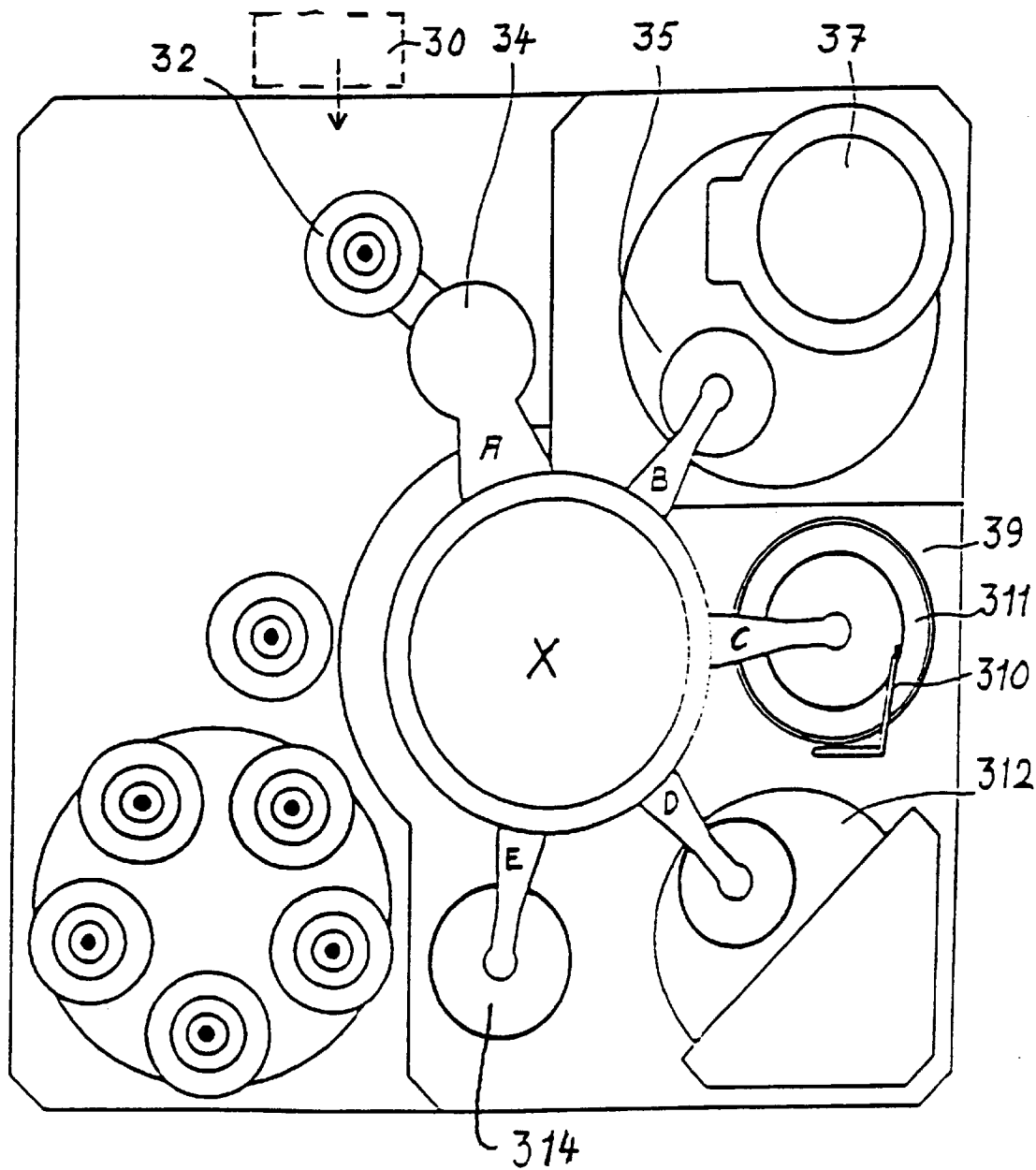
FIG. 3 illustrates part of a compact disc manufacturing machine.

The compact disc shown in FIGS. 1–2 is comprised of the actual transparent polycarbonate disc 20, an aluminium layer 21 and a protective UV lacquer layer 22 (lacquer that has been hardened in ultraviolet light). Seen from the centre of the disc and outwards, the disc includes a centre hole 10, a relatively narrow label sector 11 and a relatively broad information sector 12. The sectors 11 and 12 together form a checking sector in which the disc is checked for defects with the aid of a line camera. The surface layer of the compact disc against which scanning takes place is referenced 23.

The label sector 11 includes visible, readable text, graphics and/or bar codes.

Data is stored in a continuous spiral in the information sector 12. Defect checking takes place primarily in this sector.

The label sector 11 is processed by image recognition, therewith enabling information written into the disc to be compared with information that has earlier been written thereinto and therewith establish whether the compact disc is identical, i.e. whether or not it has been produced from the same (correct) matrix. It is also possible to decipher a bar code in the label sector for positive determination of identity.

Because the position of the label is now known, this information can be coupled to a performed defect analysis and therewith present directional information in conjunction with a screen display, which greatly facilitates determining the position of a defect in the information sector.

Defect checking is carried out primarily in the information sector.

The check thus includes simultaneous checking for defects in the lower surface layer 23, the actual disc 20 (transparent body; are there any air bubbles, any moisture or black burn spots in the disc?), the upper surface layer 24 nearest the aluminium layer 21, and the aluminium layer 21.

The check is carried out, for instance, by dividing the scan of the line camera into two parts, a first part of about 250 scanning points (pixel) in respect of the label sector 11, and an area covering approximately about 1,800 scanning points (pixel) in respect of the information sector 12 on a radius. The total number of scanning points is about 20,000.

The two areas pass through different analysis processes simultaneously, therewith obtaining a fixed connection between label information and defect information. According to the method, the disc is rotated only once, therewith obtaining a time saving of at least 50%.

In FIG. 2, the disc radius is referenced 25, the information sector is referenced 26 (=12 in FIG. 1), the label sector is referenced 27 (=11 in FIG. 1) and the scanning area of the line camera is referenced 28 (=11 and 12 in FIG. 1).

The cost entailed by the combined technique is only marginally higher than the cost of solely defect analysis, because the technique/construction permits the use of the same components for both functions.

The proposed technique enables images to be superimposed when storing images of compact discs having serial defects. It is thereby possible to determine whether or not defects from different discs are located at the same relative positions, whether or not the defects are close together for instance, or whether or not they are spread over the whole of the surface inspected. This provides a highly effective defect searching auxiliary.

The compact disc manufacturing machine illustrated schematically in FIG. 3 includes a plurality of positions 32-34-35-37-312-314, where each position represents a stage in the manufacturing process. These manufacturing stages are carried out with the aid of a central manipulator X that has a plurality of manipulator arms A, B, C, D, E. Only some of the machine functions will be described in this document, with the intention of providing an explanation of the possibilities afforded by the aforesaid defect searching auxiliary.

Newly produced compact discs comprised purely of polycarbonate plastic dispensed from an injection moulding plant particularly adapted for the manufacture of compact discs, via automatic outfeeders 30, to a position 32 which has a temporary storage or buffer location for 2×75 discs intended for equalizing differences in production rates, stops or interruptions for carrying out minor servicing on the injection moulding plant, or in the following working process. When buffer pin at position 34 is empty, the discs are shifted from position 32 to position 34, where they are plucked up successively by suction cups on the manipulator arm A which, similar to other arms B-E, is attached to the common central manipulator X. This is programmed to move the arms to either one of two radial end positions and to an upper and a lower position, such as to enable the discs to be moved successively from stage to stage in predetermined working positions.

The manipulator arm B located in position 35 lifts an aluminium coated disc and moves the disc clockwise to position 39, where the arm is lowered and places the disc on a holder that includes a suction means and a servomotor. The arm B is then raised to leave space for an arm 310 which carries at one end a nozzle for dispensing hardening UV lacquer. The arm is moved towards the centre of the disc and lacquer is pumped onto the slowly rotating disc by the servomotor. The disc is then accelerated in accordance with a predetermined program, wherewith the UF-lacquer is distributed radially by the centrifugal force thus generated and remaining lacquer is collected in a basin 311.

This describes the modus operandi of the machine. Examples of the possibilities provided by the defect searching auxiliary in connection with the CD machine can now be mentioned.

1. If it is found that a defect on the discs occurs in exactly the same place on each disc, it can be concluded that the defect is caused upstream of position 32 since the discs upstream of this position have not yet been rotated.

2. If the defects are found on one and the same radius and roughly in the same region, it can be assumed that the defect was caused upstream of position 39, since the discs rotate slightly in conjunction with handling procedure between and in the different positions.

3. If the defects are found at one end and the same radial distance, have the same appearance but are spread randomly across the disc, or are of a circular or spiral configuration (transversely of the radius), it can be assumed that these defects are caused at position 39 and positions thereafter, since the disc is rotated through many turns in two different positions at and after said position 39 prior to arriving at the inspection position.

4. If the defects are spread fully irregularly, it can be assumed that the defect has not been caused by anything of a mechanical nature but by an injection-moulding technical nature or an inspection-technical nature. In the case of this type of defect, it is also of value to be able to see graphically whether or not the defects resemble each other in form and intensity, from which certain conclusions can be drawn.

What is claimed is:

1. A method for automatically checking circular information carriers, comprising identifying information carriers, surface checking for faults, errors, damage or other defects in the surface of the information carrier, and presenting discovered defects graphically, characterized in that for the purpose of identifying the information carrier (20), there is carried out a first process for image recognition within a label sector (11) of the information carrier (20) having characters that can be sight-read; in that for the purpose of surface checking the information carrier (20), there is carried out a second process within an information sector (12) of the information carrier having stored data; and in that in the graphic presentation discovered defects are presented in relation to the label sector (11), thereby enabling the position of a detected defect to be determined more readily by virtue of obtained directional information.

2. A method according to claim 1, characterized by storing mutually superimposed direction-determined images of information carriers (20) in conjunction with the graphic presentation, such that all label sectors (11) from separate information carriers (20) will cover one another, thereby greatly facilitating the analysis of causes of detected defects.

* * * * *